June 9, 1942.  P. E. MERCIER  2,286,150
AUTOMATIC WING LIFT VARYING DEVICE FOR AIRCRAFT
Filed April 7, 1937  8 Sheets-Sheet 2

INVENTOR:
PIERRE ERNEST MERCIER
BY Haseltine, Lake & Co.
ATTORNEYS

INVENTOR:
PIERRE ERNEST MERCIER
BY Haseltine, Lake & Co.
ATTORNEYS

INVENTOR:
PIERRE ERNEST MERCIER
BY Haseltine, Lake & Co.
ATTORNEYS

June 9, 1942. P. E. MERCIER 2,286,150
AUTOMATIC WING LIFT VARYING DEVICE FOR AIRCRAFT
Filed April 7, 1937  8 Sheets-Sheet 7

INVENTOR:
PIERRE ERNEST MERCIER
BY Haseltine, Lake & Co.
ATTORNEYS

June 9, 1942.  P. E. MERCIER  2,286,150
AUTOMATIC WING LIFT VARYING DEVICE FOR AIRCRAFT
Filed April 7, 1937   8 Sheets-Sheet 8

INVENTOR:
PIERRE ERNEST MERCIER
BY Haseltine, Lake & Co.
ATTORNEYS

Patented June 9, 1942

2,286,150

UNITED STATES PATENT OFFICE 2,286,150

AUTOMATIC WING LIFT VARYING DEVICE FOR AIRCRAFT

Pierre Ernest Mercier, Paris, France

Application April 7, 1937, Serial No. 135,441
In France April 10, 1936

8 Claims. (Cl. 244—42)

This invention relates to an improved device for limiting the effort necessary to overcome the aerodynamic forces on aircraft in flight.

Aircraft, in which the support when flying depends on the air speed thereof, when traveling at high speeds are subject to sudden variations of the aerodynamic forces which support them under the effect of atmospheric currents such as gusts of air or of a change of incidence caused by the pilot straightening out the longitudinal trim of the aircraft.

The main object of the present invention is to limit automatically the effect of aerodynamic forces ensuring the support of aircraft and consists essentially in the combination:

1. Of a flap, which may or may not be slotted, preferably extending over the whole length of the wings of the aircraft and adapted to be deflected upward or downward on each side of a mean position.

2. Of a servo-motor having for its object to vary this deflection of the flap in as short a time as possible.

3. Of a member controlling the servo-motor and herein termed the "pilot member," the positions of which are a function of both the deflection of the flap and the deformation of the wing caused by the aerodynamical forces exerted thereon in such manner that within certain limits fixed in advance a particular position of the flap in a state of equilibrium will correspond to each degree of deformation of the wing, the said correspondence depending to a varied degree upon the speed of deformation of the wing.

A particular embodiment of the pilot member referred to in its relations to the deformations of the wing includes an element sufficiently rigid with respect to the forces which it has to sustain that its length may be considered as invariable relatively to the structure of the wing, said element being located interiorly of the wing in the direction of the length or width thereof in its thickest portion and close to its surface, while one of the extremities of said element which may be termed the comparison element, is fixed rigidly at one point of the wing structure close to its surface. The other extremity of said element has its point of support located on the same control member of the servo-motor and is also connected to the wing structure close to the same surface in such manner that every elastic deformation of said wing structure in the form of an extension or contraction permitting flexing deformations, will produce a displacement of said control member of the servo-motor in the absence of the corresponding deflection of the said flap.

The invention will be better understood by reference to the annexed drawings and to the following description relating thereto, the figures showing by way of non-restrictive examples, various means for carrying the invention into effect.

Figures 1 to 6 of the drawings represent diagrammatically the principle of the arrangement according to the invention; thus.

Figures 7 to 14 represent a practical embodiment satisfying in its entirety the principles explained, adding thereto various improvements of detail important owing to their general extent; and of which

Figure 1:
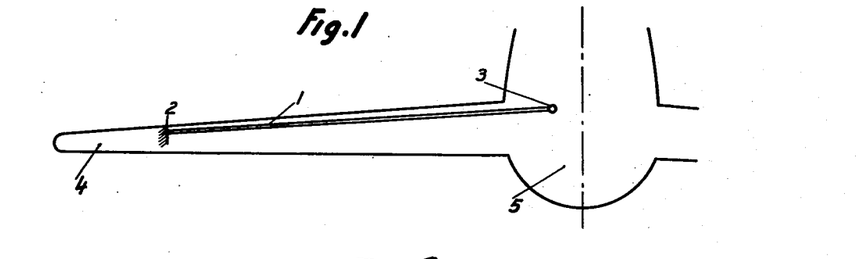
Figure 1 shows in vertical section a comparison element arranged within an aeroplane wing.
Figure 4:
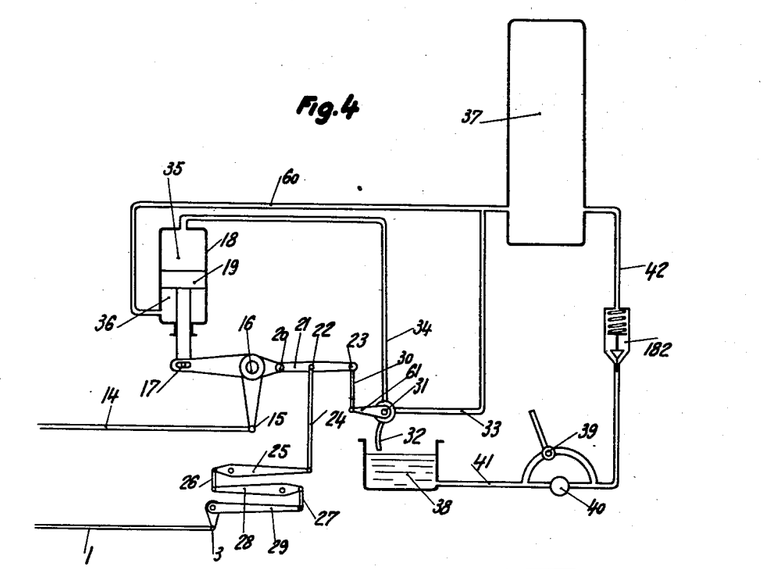
Figure 4 shows diagrammatically the arrangement of a servo-motor with its control and feed members.

Referring more particularly to the drawings, Figure 1 shows the arrangement of a comparison element 1 in the interior of an aeroplane wing 4; the outer extremity 2 of the comparison element is connected to the structure of the wing, while the inner extremity 3 of said element extends into the interior of the fuselage 5 and is connected to the control member of a servomotor by a suitable means, such for example, as that shown in Figure 4.

Figure 2:
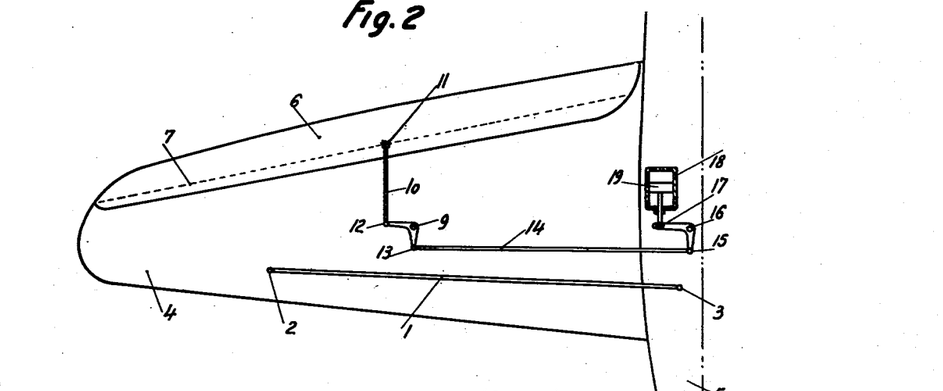
Figure 2 is a plan view of the aeroplane wing shown in Fig. 1.
Figure 3:
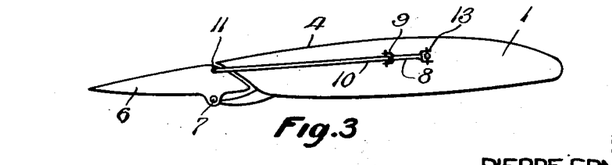
Figure 3 is a cross sectional view thereof.

Figure 2 represents a plan view of the aeroplane wing 4 of Figure 1. This wing comprises a flap 6 movable about a pivot 7 on the trailing edge of the wing and controlled by connecting rods such as 10 also shown in Figure 3, which is a cross-sectional view of the wing. The connecting rod 10 is hinged at its outer extremity 11 to the flap 6 and at its other extremity 12 to one arm of a bell crank lever, which is mounted on a pivot 9 carried by the wing structure. The other arm 13 of the bell crank lever is coupled by a connecting rod 14 to one arm 15 of a second bell crank lever pivoted at 16 and which is connected at 17 to the rod of the piston 19 of a servo-motor cylinder 18.

Figure 4 shows diagrammatically and on a larger scale an example of a servo-motor with its control and feed members. The servo-motor is of the hydraulic type and comprises a cylinder 18 and a piston 19 dividing the cylinder into two spaces 35 and 36. For a given displacement of the piston 19, the space 36 alters less in volume than the space 35 by reason of the volume of the space 36 occupied by the piston rod. The space 36 is in permanent communication by a pipe 60 with a hydraulic accumulator 37 in which a liquid is stored under the pressure of any elastic agent. The cylinder space 35, through a pipe 34, communicates with a threeway cock 31, which has a control plug operatively coupled by a lever 61. Two other pipes 32 and 33 opening into the valve 31 serve to place the cylinder space 35 in communication with an external collecting tank 38 or with the accumulator 37 through the cock or valve. The tank 38 communicates with a pump 40 or with a hand emergency pump 39, and with a pipe 42 which is provided with valves 182 capable of preventing the return of the oil from the accumulator towards the tank. The control by the lever 61 of the cock 31 is effected by means of a connecting rod 30 hinged at one end of a rocker 21 which is connected at the other end 20 to an arm extending from the bell crank 16. The rocker 21 is connected at a point 22 by a connecting rod 24 to a system of amplifying levers 25, 28 and 29 interconnected among themselves by links 26 and 27 and hingedly connected at 3 to the comparison element 1.

The operation of the device is as follows: under the effect of a gust of air or of the movement of the aeroplane when the longitudinal trim thereof is straightened out, the point 3 shifts and causes the displacement of the point 22 and a rotational movement of the plug of the cock 31 by means of the amplifying lever system, bringing the chamber 35 into communication with the accumulator 37. This causes a downward movement of the piston 19, and a movement of the point 20, the effect of which, relatively to the lever 61 of the plug of the cock 31 is opposite to the displacement of the point 22 as determined by the displacement of the point 3. The piston 19, in moving the bell crank 16, also moves the flap 6 so as to compensate for the intensified aerodynamical action of the gust of air or straightening out movement of the aeroplane. The gust or squall having passed or the straightening out movement having become less accentuated, the point 3 returns to its initial position and this effects a reverse movement of the cock so as to cause the chamber 35 to be brought into communication with the tank 38.

The operation of pump 40 may be made automatic in dependence upon the pressures in the accumulator 37, while the object of said pump is to recharge the accumulator, and to limit the volume of the liquid in the tank 38. In case anything happens to the mechanical control of pump 40, the manually operable emergency pump 39 may be utilized.

Figure 5:
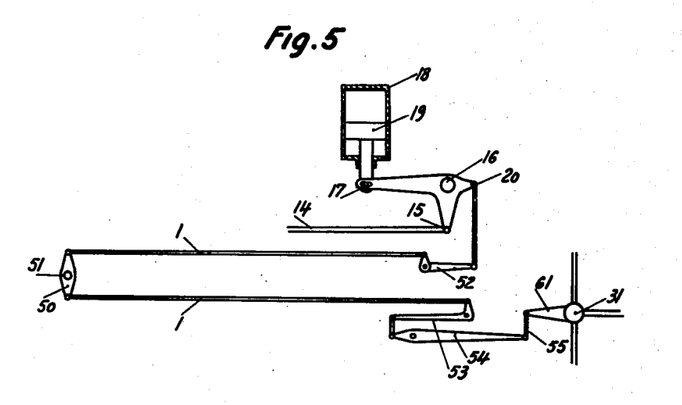
Figure 5 shows an arrangement wherein the comparison element is formed by two sections.

Instead of combining the displacements of the piston 19 with the displacements of the point 3 by means of the lever 21, it is possible, as shown in Figure 5, to use a comparison element formed of two sections or of an even number of sections connected two by two on the opposite side to the servo-motor by means of rockers such as 50, mounted on pivots 51 which are carried by the wing structure. It is then sufficient to connect one of the ends of one of the bars 1 to the point 20 of the bell crank 16 and an end of the other bar to the lever 61 of the cock 31. Hence, when it is desired to use the aforesaid mechanism not only as an automatic force limiting device but also as a manually actuated flight controlling device, means may be provided for varying the length of the connecting rod 30 or 24 in Figure 4, the power necessary for actuating said means being only slight, while the power necessary for the deflection of the flap 6 for the purpose of flight control is furnished by the accumulator 37.

When it is desired that the wing deformation shall act on the position of the flaps differently than as a function of the variation speed of said wing deformation, an intermediate element may be introduced in the connection between the driving extremity of the comparison element and one of the points of the mechanism displaced by the servo-motor, said intermediate element being elastic with initial tension and provided with damping means.

Figure 6:
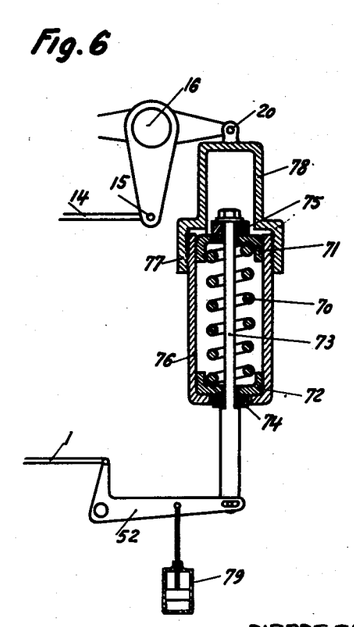
Figure 6 shows in section the connection between the comparison element and the mechanism displaced by the servo-motor.

Figure 6 shows a device forming one means of embodying a connection of this type, interposed between the lever 52 of Figure 5 and the point 20 of the bell crank lever actuated by the servo-motor. This device includes a spring 70 held between two washers 71 and 72, while a rod 73 extends between the two washers 71 and 72 and through the spring. Movement of the rod 73 upward is transmitted to the washer 72 by a ring 74 and downward to the washer 71 by a stop ring 75. The whole is enclosed in a cylindrical casing 76 having a cover 77 which is hinged by a strap 78 to the point 20. A damper 79 connected between the lever 52 and a fixed point completes the device.

The invention has been described so far as applied to a half wing, but it is easily possible to generalize the application, thereof to the two wings of an aircraft either by a separate control for each wing or by a single control, the flaps of the two wings in the latter case being connected together in an invariable manner.

The connection 60 (Figure 4) between the accumulator 37 and the cylinder space 36 which serves to return the piston 19, may be replaced by any elastic means for returning the piston, for example, springs exerting their action at any suitable point of the mechanical connections of the different members of this arrangement.

Figure 4A:
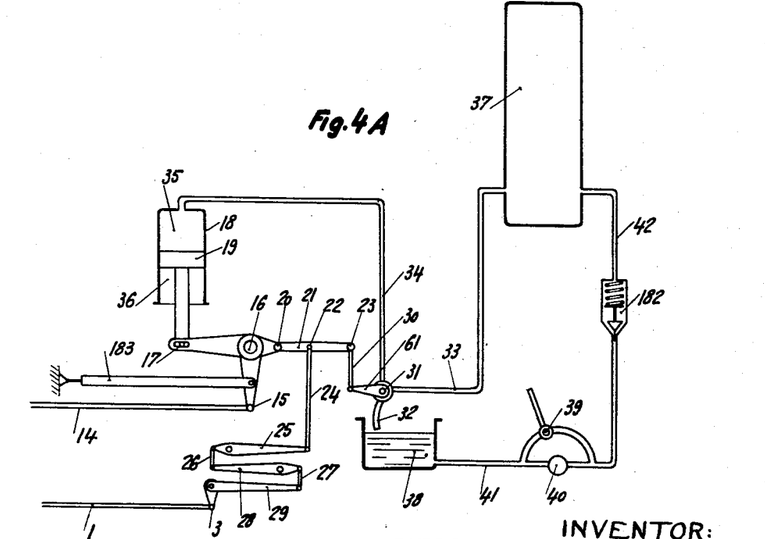
Figure 4a illustrates a modification of the apparatus of Figure 4.

This embodiment is shown in Figure 4A, in which the connection is omitted and the cylinder 18 is open at the bottom, while an elastic cord 183, anchored to a fixed point of the system, is attached on the other hand to the arm 15 of the lever in order to exert on the piston 19 a force antagonistic to the liquid admitted to the space 35.

Figure 6A:
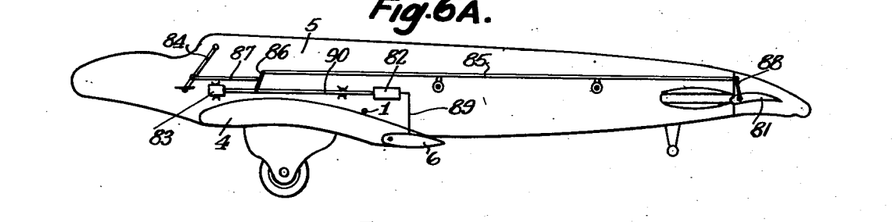
Figure 6a shows the arrangement of a connection between the lift varying means and a control surface of the aricraft.

The arrangements already described above are illustrated in Fig. 6A, wherein furthermore a connection is shown between the stabilizing flap 6 and the horizontal rudder 81. This connection is established across the various control rods 89, 90, 86, 85 and 88. An elastic connecting member 82 and a damper 83 are interposed in the connection 90. The horizontal control 90 may also be actuated independently, as usual, by the control member across the connection 87.

The following Figures 7 to 14 show a more detailed example of the invention in which the mechanism described is of the hydro-pneumatic type.

This embodiment of the invention will be better understood by the following description with particular reference to Figures 7 to 14 which show non-restrictive examples.

Figure 7:
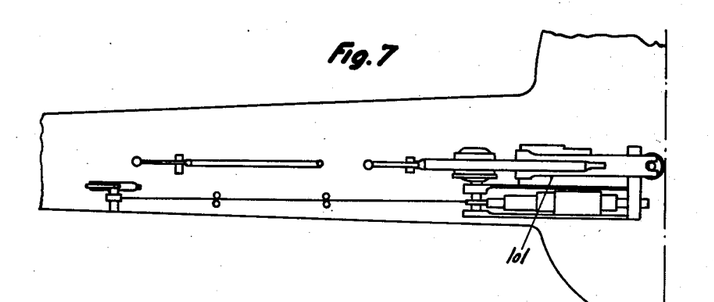
Figure 7 is a vertical section, Figure 8, a plan view, Figure 9, a side view.
Figure 8:
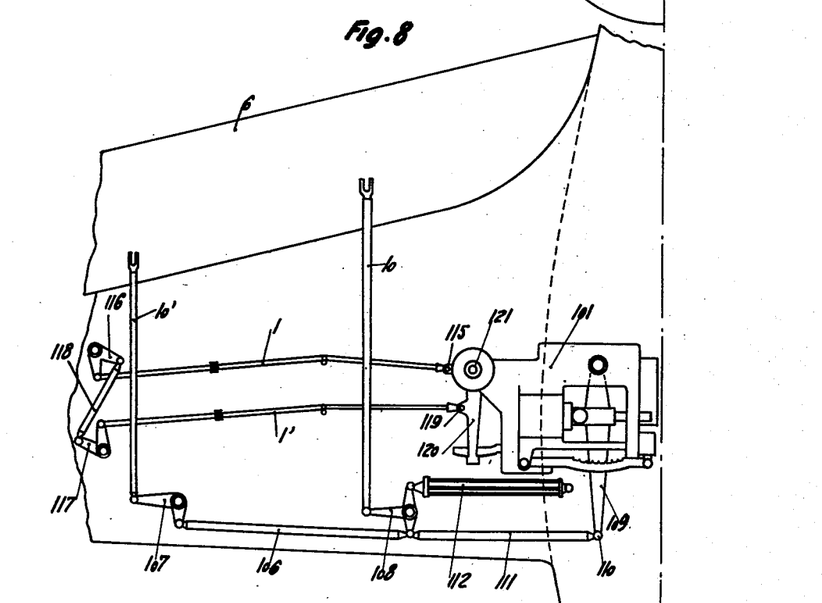
Figure 9:
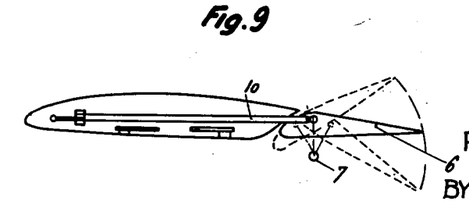

Figures 7, 8 and 9 represent diagrammatically and respectively in vertical section, plan and side view, the installation of the present mechanism for one wing of an aeroplane.

The mechanism proper comprising the servo-motor and control member thereof is shown diagrammatically at 101. The flap 6 on the trailing edge of the wing which controls the aerodynamic forces on the wing is shown hinged on a pivot 7 and is controlled by two rigid connecting rods 10 and 10' these connecting rods being interconnected by means of bell crank levers 107 and 108 and a coupling rod 106. The control lever 109 of the servo-motor is hinged at 110 to a connecting rod 111 which connects the lever 109 to the bell crank lever 108. A group of extensible springs 112 acts against the connecting rod 111 and tends to lower the flap 6. Cords 1, 1' which detect the deformation of the wing are arranged as a double system; one of the extremities of this system including the free ends of the cords 1, is anchored at 115 to a fixed point of the frame of the servo-motor 101. At the ends of the cords 1, 1' remote from the servo-motor, the cords 1 and 1' are interconnected by a reversing mechanism comprising bell crank levers 116 and 117 which are operatively connected together by a rod 118. This latter device is equivalent to a rocking lever counterbalancing the forces in and the displacements of the double cord system 1 and 1'. The cords 1' are anchored at 119 to a movable lever 120 hinged at 121 on the frame of the servo-motor.

Figures 10, 11:
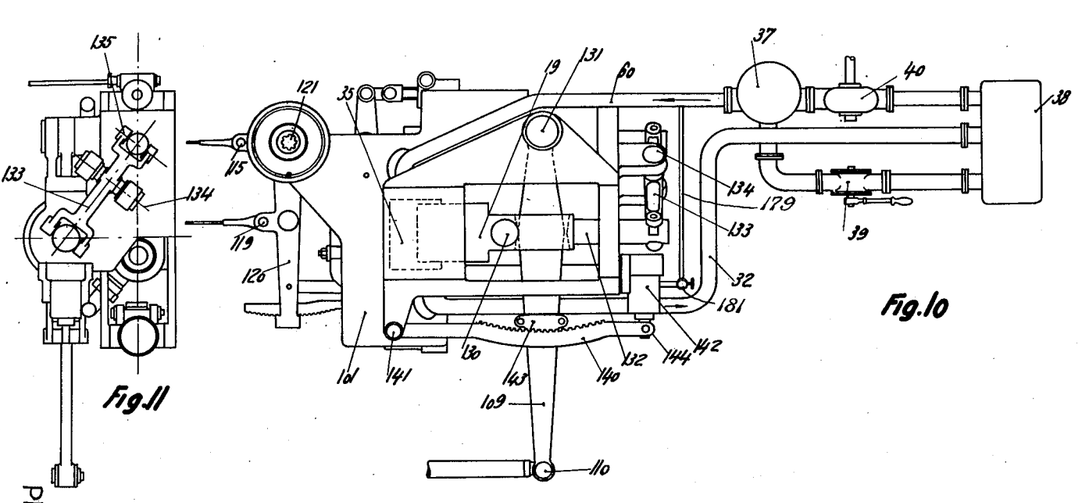
Figure 10 is a plan view of the servo-motor and its accessory parts.
Figures 11, 12 and 13 are side views thereof.

In Figures 10, 11, 12 and 13 are shown the plan view and the different side views of the servo-motor. In the plan view of Figure 10 the arrangement of the accessory parts such as pumps, accumulator and tanks are shown diagrammatically with the servo-motor. The active piston of the servo-motor is shown in Figure 10 at 19 and the cylinder space in which the motive liquid acts on this piston is indicated at 35. The liquid under pressure comes from the accumulator, shown at 37, through a pipe 60 while the return of the liquid discharged from the space 35 occurs through a pipe 32 into the tank shown diagrammatically at 38. The recharging of the accumulator 37 is normally ensured by the automatically controlled pump shown diagrammatically at 40.

The manually operable safety or emergency pump 39 duplicates the pump 40 and allows recharging the accumulator 37 from the liquid accumulated in the tank 38. The piston 19 which in the case shown is single acting from the left towards the right, bears on the lever 109 by means of a roller 130, the lever 109 being pivoted on the frame 101 on a pivot 131. The lever 109 is provided with a fixing device which comprises a toothed sector 140 movable about a pivot 141 carried by the frame 101 and controlled by a spring controlled piston 142 acting on its extremity 144. When pressure liquid from the accumulator 27 is not applied on the piston 142 through the pipe 179 controlled by a valve 181 operated by the pilot so that the control spring of the piston may act freely on the said sector, the sector 140 can freely engage with a toothed plate 143 carried by the lever 109. The piston rod 132 of the piston 19 is slotted so as to allow the lever 109 to extend therethrough and the outer extremity of this rod actuates an oblique rocker 133 which is mounted at one end upon a fixed pivot 134 shown in Figures 10 and 11. The rocker 133 at its other end 135 controls a driving member of a transmission device which introduces a demultiplication in the displacements of the driving and driven members, said demultiplication being variable with the driving member speed as well known in the art, and the fixed body 135 of which is best shown in Figure 12.

Figure 12:
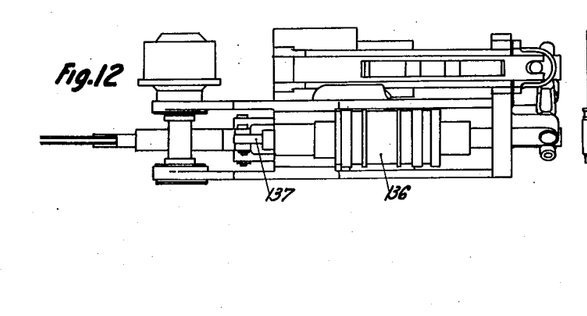
Figure 13:
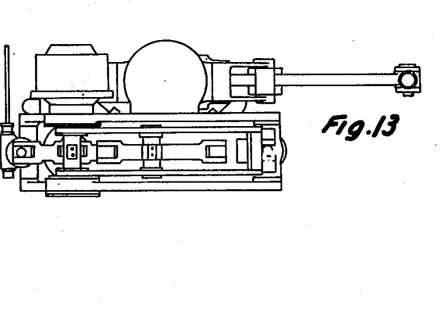
Figure 14:
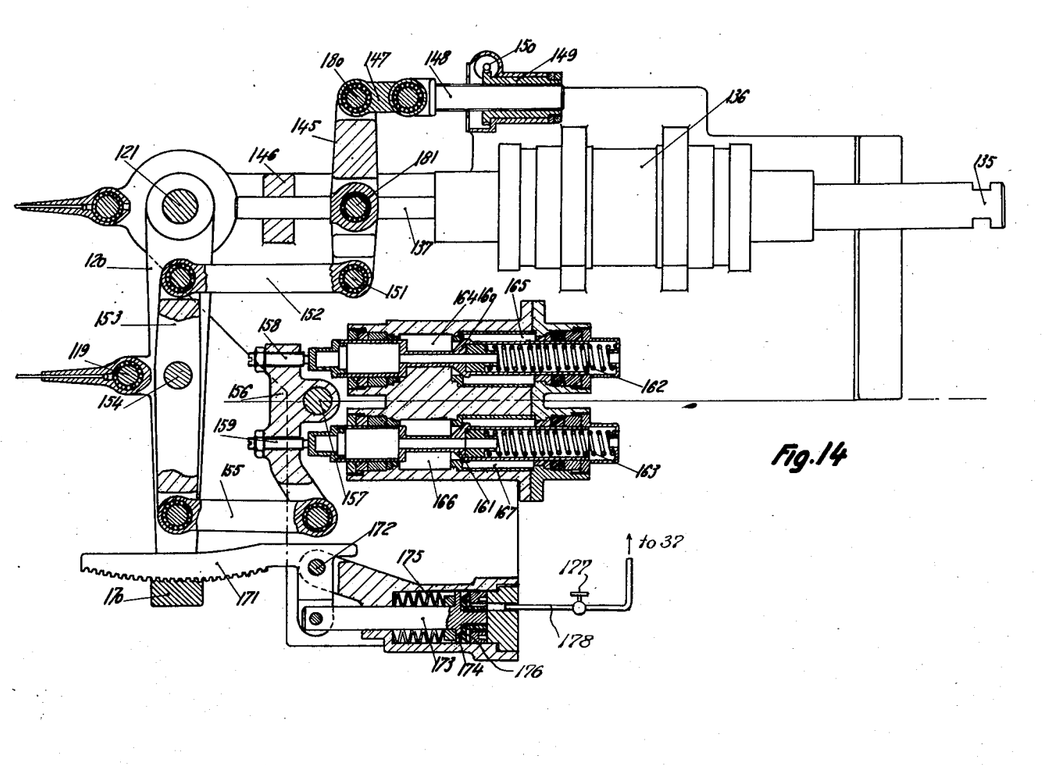
Figure 14 is a cross section, on a larger scale, of the arrangement shown in Figure 10.

The member controlled by this mechanism shown at 137 in Figure 12, carries a small rocking lever 145, shown in Figure 14, which shows on a larger scale a section of the device of Figure 10.

The member controlled by the device 136 shown in Figure 14 carries the small double rocker 145 and its extension is guided by a bearing 146. The double rocker 145 is connected at one end by means of a link 147 to a manipulating member 148. As shown in Figure 14 the member 148 comprises a screw-threaded spindle about which a nut 149 can rotate which is secured against lateral and longitudinal displacement. The nut 149, the rotation of which may be effected by the pilot, can be driven by chain, cable or by a flexible transmission with tangential engagement of the nut, as illustrated diagrammatically at 150 by a worm gear.

The type of manual control may be such that the pilot acts on both wings either so that moving flaps are displaced in the same direction when they are used as camber flaps, or in opposite direction if they are used as lateral flight control flaps. This part of the device being known in the field of current practice of flight control for aircraft is not here described in greater detail.

The other end of the rocker 145 is pivoted at 151 to a connecting rod 152 which couples the rocker 145 to one end of a second rocking lever 153 movable about a pivot 154 carried by the previously mentioned lever 120 so that the rocker 145 controls this second rocker.

The other end of the rocker 153 is connected by a rod 155 to a rocking lever 156 controlling valves 160 and 161; the rocker 156 pivoted at 157 carries two adjustable thrust members 158 and 159 respectively controlling the valves 160 and 161; these valves are arranged in such manner that the forces of the liquid applied thereto are as small as possible and as little dependent as possible upon their state of opening or of closing. This result is obtained owing to the fact that the valve guide stems are provided on the left with enlarged parts the diameter of which is approximately equal to that of the valves; when the valve is displaced to the right, said enlarged part enters the chamber 164 and 166 and keeps the volume occupied by the liquid approximately constant; therefore the stress of the liquid on the valve does not increase whatever the latter's position of opening. The valves are under the influence of return springs 162 and 163 which normally press the valves on their seats. The valves 160 and 161 control the passage of the liquid respectively between chambers 164 and 165 on the one hand and 166 and 167 on the other hand. One of the chambers 164 or 166 communicates with the piping 60 and the other chamber communicates with the piping 32, while chambers 165 and 167 communicate with the space 35 forming the working chamber of the active piston 19.

Any other combination and communication can be effected provided that one of the valves controls the entry of the liquid (piping 60) whilst the other controls the discharge of the liquid (piping 32).

The lever 120 on which the system of detecting cords 1' acts through a joint 119 is connected in such manner as to oppose the action of these cords by means of a torsion bar or a rubber socket fixed on the axis 121. The lever 120 has a toothed part 170 at its free end adapted to engage with a movable section 171 pivoted at 172 to the fixed frame and controlled angularly by a rod 173 terminated by a piston 174 on which a return spring acts comprising a series of Belleville washers 175, and if necessary a fluid under pressure is also introduced on to the face 176 through a tube 178, which fluid may be taken from the accumulator 37. The admission of said fluid to the piston 174 is controlled by a valve 177 operable by the pilot, as has been mentioned in connection with piston 142. The devices 170—171 and 140—143 serve to lock and to release the levers 120 and 109 respectively, the pilot doing this by hand.

Figure 15:
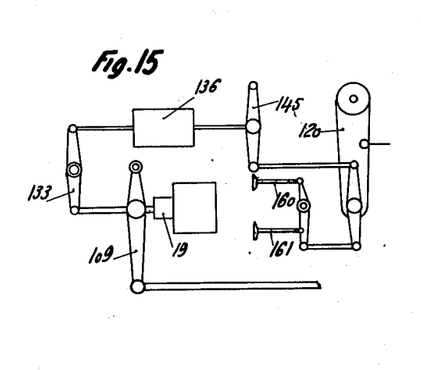
Figures 15 to 24 are diagrams showing the successive positions of the different members of the mechanism.
Figure 16:
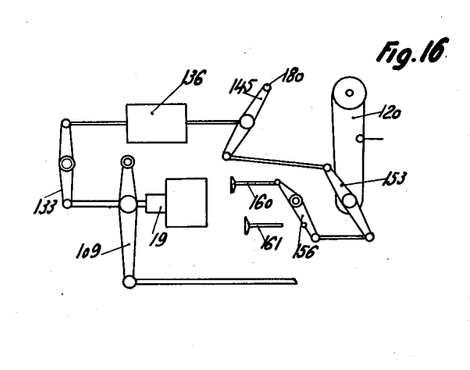
Figure 17:
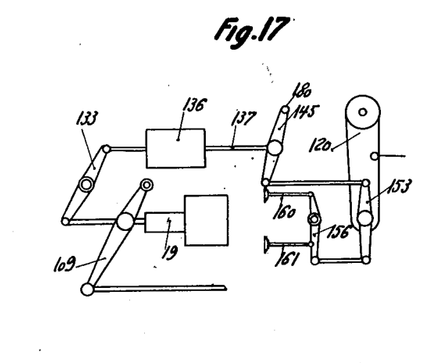

The operation of the system will be easier to follow by reference to Figures 15, 16, 17, 18 and 19, which represent diagrammatically the successive positions occupied by the different members. The pilot member acts on the control 150 to produce the displacement of the flaps and then brings this control back to the initial position of rest. In Figure 15 the device is at rest. When the member 148 in Figure 14 has moved towards the right, the rocking lever 145 in Figure 16 takes up an inclined position, the lever 120 being assumed to be stationary and locked (by the toothed sector shown in Fig. 14) the rocking lever 153 in turn also takes up an inclined position and effects the inclination of the rocking lever 156 and the opening of the admission or charging valve 160. This effects in a displacement of the piston 19 of Figure 17 which causes an angular movement of the control lever 109, which in turn effects the deflection of the flap and, by means of the rocking lever 133, the displacement of the member leading from the device 136. This then also causes the displacement of the actuated member 137 to occur, as well as a reverse movement of the rocking lever 145 transmitted to the rocking lever 153 and to the rocking lever 156, whereupon the valve 160 again closes, and Figure 17 thus represents a fresh position of equilibrium of the lever 109 and also of the flap resulting from the displacement of the pivot of member 148 and of the pivot 180 of lever 145.

Figure 18:
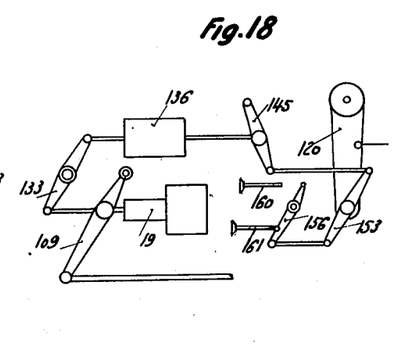
Figure 19:
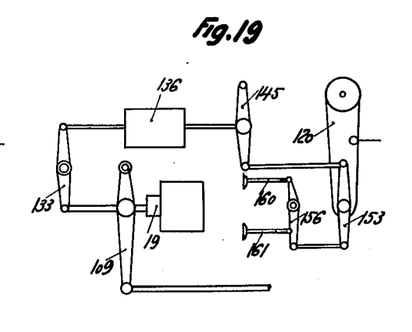

Figures 18 and 19 represent the reverse movement when the member 148 is moved in the opposite or return direction and consequently when the pivot 180 is brought into the position of Figure 15. The system as a result of the opening of the valve 161 then resumes the same positions again, Figures 15 and 19 being identical.

Figure 20:
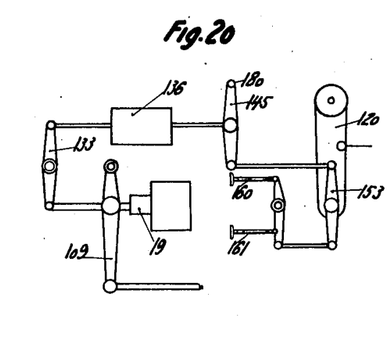

Figures 20, 21, 22, 23 and 24 illustrate the operation of the device under the action of the detector of deformation of the wing alone, the pilot member 148 remaining stationary, Figure 20 corresponding to the rest position.

Figure 21:
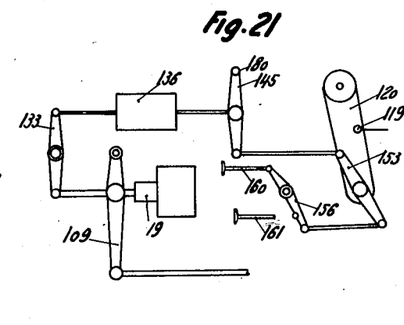
Figure 22:
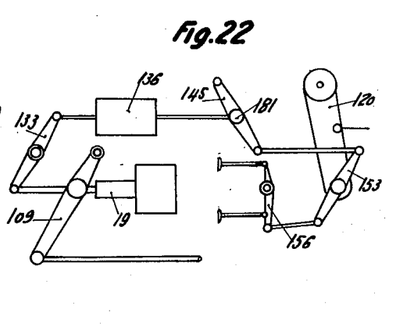
Figure 23:
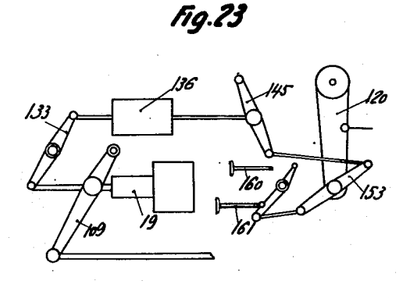
Figure 24:
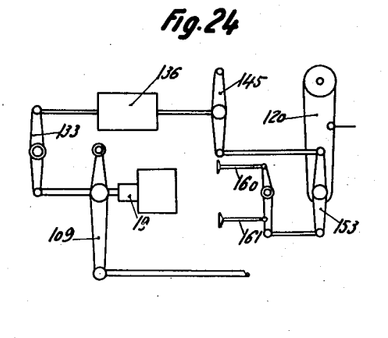

Under the action of a squall or of a trim straightening movement, the wing having been deflected, the cords 1' shown in Figure 8 exert a tractive force on lever 120 and displace it into an inclined position; while as shown in Figure 21 the rocker lever 153 inclines and the valve 160 opens, in view of the fact that the point 180 does not move. The result is the displacement of the lever 109 (Figure 22) which tends to raise the flap and thus to diminish the lift of the wing. The movement of the lever 109 by means of the lever 133 and of the connecting member 136, displaces the point 181 which acts on the rocking lever 153 and consequently on the rocking lever 156, which closes the valve 160. The lift of the wing having diminished by virtue of the deflection of the flap and the squall having passed, the lever 120 tends to resume its initial position. As shown in Figure 23, a fresh displacement of the rocking lever 153 results which effects the opening of the valve 161. The squall having passed, the system resumes its position of equilibrium. As shown in Figure 24, the deadening of the oscillations which might start by the coupling made between the deflection of the flap and the deformation of the wing, is obtained by the play of the connecting member 136. Owing to the presence of this connecting member, any danger of vibration will be eliminated outside the possibility of damping proper of the wing on which the device for the limitation of the aerodynamic forces is mounted.

It has been stated that levers 109 and 120 are provided with locking devices including respectively the toothed sectors 140 and 171. The application of these sectors on to the corresponding parts 143 and 170 of the levers is effected by resetting springs 142 and 173, the action of which is equilibrated by the motive pressure of the fluid which is exerted in the accumulator. This pressure may be increased or reduced as desired by the pilot, by manipulation of a valve 181 or 177. Whenever the pressure of the liquid drops owing to an accident the locking of the levers takes place automatically for the purpose of ensuring safety. To this end the adjustment of the springs 142 and 175 will preferably be carried out in the following manner: the springs 175 of the piston 173 will be calibrated for a pressure greater than that which will act on the piston 144, in such manner that when the pressure is about to diminish to a value below the safety limit, the lever 120 will be the first to become locked or immobilized, and this will eliminate the action of the detectors of wing deformation. The result will be that at the moment when the lever 109 in its turn is about to become locked while the pressure is continuing to fall in the accumulator, said lever 109 before being locked will have taken up the position corresponding to a condition of rest, as defined by the position of the member 148 operable by the pilot.

The invention is naturally capable of numerous modifications of construction within the scope of the appended claims.

It should particularly be understood that the device may control any system of flaps with or without slots and more generally any member or mechanism allowing the lift to be varied.

Having now fully described my invention, I claim:

1. In a winged aircraft, means operable to vary the lift of the wings, at least one comparison element associated with the wing surface and adapted to be altered in shape by the aerodynamic forces on the wing in a manner different from the alterations in shape of the wing surface and means comprising a servo-motor operable to control by the comparison element the said lift varying means, the said servo-motor comprising a motive piston in a cylinder filled with fluid, a fluid reservoir under pressure and a fluid discharge reservoir connected respectively to the cylinder spaces on each side of the piston, a distributing valve in the said connections controlled by the comparison element and a recharging pump interposed in the connection between the reservoir under pressure and the discharge reservoir.

2. In a winged aircraft, means operable to vary the lift of the wings, at least one comparison element associated with the wing surface and adapted to be altered in shape by the aerodynamic forces on the wing in a manner different from the alterations in shape of the wing surface and means comprising a servo-motor operable to control by the comparison element the said lift varying means, the said servo-motor comprising a motive piston in a cylinder filled with fluid, a fluid reservoir under pressure and a fluid discharge reservoir connected respectively to the spaces of the cylinder on each side of the piston, a distributing valve in the said connections controlled by the comparison element, an automatic recharging pump interposed in the connection between the reservoir under pressure and the discharge reservoir and a manual pump forming a duplicate of the automatic pump.

3. In a winged aircraft, means operable to vary the lift of the wings, at least one comparison element associated with the wing surface and adapted to be altered in shape by the aerodynamic forces on the wing in a manner different from the alterations in shape of the wing surface and means comprising a servo-motor operable to control by the comparison element the said lift varying means, the said servo-motor comprising a motive piston in a cylinder filled with fluid, a fluid reservoir under pressure and a fluid discharge reservoir connected respectively to the spaces of the cylinder on each side of the piston, valves controlling respectively these connections, a rocking lever connected to the said valves, means controlled by the comparison element to place the rocking lever alternately in two active positions in which one of the said valves is opened and the other closed and into at least one intermediate neutral position in which the two valves are closed, and a re-charging pump interposed in the connection between the reservoir under pressure and the discharge reservoir.

4. In a winged aircraft, means operable to vary the lift of the wings, at least one comparison element associated with the wing-surface and adapted to alter in shape by the aerodynamic forces on the wing in a manner different from the alterations in shape of the wing surface and means comprising a servo-motor operable to control by the comparison element the said lift varying means, the said servo-motor comprising a motive piston in a cylinder filled with fluid, a fluid reservoir under pressure and a fluid discharge reservoir connected respectively to the spaces of the cylinder on each side of the piston, valves controlling respectively the said connections, a rocking lever connected to the said valves, means controlled by the comparison element to place the rocking levers alternately in two active positions in which one of the said valves is open and the other closed and into at least one intermediate neutral position in which both valves are closed, means operable to control the rocking lever by the movements of the piston of the servo-motor, means operable to control the rocking lever by a manipulating member controllable by the pilot of the aircraft, and a recharging pump interposed in the connection between the reservoir under pressure and the discharge reservoir.

5. In a winged aircraft, means operable to vary the lift of the wings, at least one comparison element associated with the wing surface and adapted to be altered in shape by the aerodynamic forces on the wing in a manner different from the alterations in shape of the wing surface and means comprising a servo-motor operable to control by the comparison element the said lift varying means, the said servo-motor comprising a motive piston in a cylinder filled with fluid, a fluid reservoir under pressure and a fluid discharge reservoir connected respectively to the spaces of the cylinder on each side of the piston, valves controlling respectively the said connections, a rocking lever connected to these valves, means controlled by the comparison element to place the rocking lever alternately into two active positions in which one of the said valves is opened and the other closed and into at least one intermediate neutral position in which the two valves are closed, means operable to control the rocking lever by the movements of the piston of the servo-motor, means operable to control the rocking lever by a manipulating member controllable by the pilot of the aircraft, means operable to suppress the action of the comparison element on the rocking lever, and a recharging pump interposed in the connection between the reservoir under pressure and the discharge reservoir.

6. In a winged aircraft, means operable to vary the lift of the wings, at least one comparison element associated with the wing surface and adapted to be altered in shape by the aerodynamic forces on the wing in a manner different from the alterations in shape of the wing surface and means comprising a servo-motor operable to control by the comparison element the said lift varying means, the said servo-motor comprising a motive piston in a cylinder filled with fluid, a fluid supply reservoir under pressure and a fluid discharge reservoir connected respectively to the spaces of the cylinder on each side of the piston, valves controlling respectively the said connections, a rocking lever connected to the said valves, means controlled by the comparison element to place the rocking lever alternately in two active positions in which one of these valves is open and the other closed and into at least one intermediate neutral position in which the two valves are closed, means operable to control the rocking lever by the movement of the piston of the servo-motor, means operable to control the rocking lever by a manipulating member controllable by the pilot of the aircraft, means operable in response to a predetermined pressure value in the supply reservoir of the servo-motor to suppress automatically the action of the comparison element on the rocking lever, and a recharging pump interposed in the connection between the reservoir under pressure and the discharge reservoir.

7. In a winged aircraft, means operable to vary the lift of the wings, at least one comparison element associated with the wing surface and adapted to be altered in shape by the aerodynamic forces on the wings in a manner different from the alterations in shape of the wing surface, means operable to control by the comparison element the said lift varying means, and means operable to control the inter connections between the comparison element and the lift varying means to afford actuation of the lift varying means independently of the deformations of the wing surface, means being provided operable to exert the said actuation as desired by the pilot of the aircraft either in a reverse or the same sense on oppositely extending wings of the aircraft.

8. In an aircraft having airfoils or wings for sustaining said aircraft in flight, controlled means operable to vary the lift of the wings, a control surface means operable to re-establish the longitudinal trim of the craft when the wings have been deflected, at least one comparison element pivotally associated with the wing surface, means upon the corresponding wing causing said comparison element to be altered in shape by the effect of the aerodynamic forces acting to deform the shape of the wing in a manner contrasting with the deformation of said wing, operable means for controlling said lift varying means through said comparison element, elastic connecting means serving to connect the lift varying means with the control surface means, and means imparting initial tension and damping to said elastic means.

PIERRE ERNEST MERCIER.